United States Patent
Brower et al.

(10) Patent No.: US 10,041,385 B2
(45) Date of Patent: Aug. 7, 2018

(54) PISTON FOR A HYDRAULIC VALVE FOR A CAM PHASER AND HYDRAULIC VALVE FOR THE CAM PHASER

(71) Applicant: ECO Holiding 1 GmbH, Marktheidenfeld (DE)

(72) Inventors: Brent Brower, Muskegon, MI (US); Daniel Stanhope, Nunica, MI (US)

(73) Assignee: ECO Holding 1 GmbH, Marktheidenfeld (DE)

( * ) Notice: Subject to any disclaimer, the term of this patent is extended or adjusted under 35 U.S.C. 154(b) by 140 days.

(21) Appl. No.: 15/361,404

(22) Filed: Nov. 26, 2016

(65) Prior Publication Data
US 2017/0260882 A1    Sep. 14, 2017

Related U.S. Application Data
(60) Provisional application No. 62/307,745, filed on Mar. 14, 2016.

(51) Int. Cl.
*F01L 1/34*    (2006.01)
*F01L 1/344*    (2006.01)
(Continued)

(52) U.S. Cl.
CPC ......... *F01L 1/3442* (2013.01); *F01L 1/34409* (2013.01); *F15B 13/0426* (2013.01);
(Continued)

(58) Field of Classification Search
CPC .............. F01L 1/3442; F01L 1/34409; F01L 2001/34426; F01L 2001/34469; F01L 2001/3443; F01L 2001/34433; F01L 2001/3444; F01L 2001/34463; F15B 13/0426; F16K 11/0716; F16K 15/18
See application file for complete search history.

(56) References Cited

U.S. PATENT DOCUMENTS

2013/0199467 A1 *  8/2013  Hoppe .................. F01L 1/3442
                                                        123/90.15
2014/0311333 A1   10/2014  Hutzelmann et al.
2014/0311594 A1   10/2014  Hutzelmann et al.

FOREIGN PATENT DOCUMENTS

DE    602005000504 T2    11/2007
DE    102008043179 A1    5/2009
(Continued)

*Primary Examiner* — Zelalem Eshete
(74) *Attorney, Agent, or Firm* — Von Rohrscheidt Patents

(57) ABSTRACT

A piston for a hydraulic valve of a rotation phaser, wherein the piston is configured hollow cylindrical, wherein the piston is axially movable in a central opening extending along a first longitudinal axis of a housing of the hydraulic valve, wherein operating connections of the housing are opened and closed according to a position of the piston, wherein the piston includes check valves which prevent an unintentional outflow of a hydraulic fluid flowing through the piston from an inner cavity of the piston in flow through openings of the piston associated with the operating connections, wherein the piston is configured with check valves in its inner cavity that open towards its interior cavity, wherein the check valves are fixated by a spacer element that is arranged between the two check valves. The invention also relates to a hydraulic valve for a rotation phaser of a cam shaft.

12 Claims, 13 Drawing Sheets

(51) Int. Cl.
*F15B 13/042* (2006.01)
*F16K 11/07* (2006.01)
*F16K 15/02* (2006.01)
*F16K 15/18* (2006.01)

(52) U.S. Cl.
CPC ........ *F16K 11/0716* (2013.01); *F16K 15/026* (2013.01); *F16K 15/18* (2013.01); *F01L 2001/3443* (2013.01); *F01L 2001/3444* (2013.01); *F01L 2001/34426* (2013.01); *F01L 2001/34433* (2013.01); *F01L 2001/34463* (2013.01); *F01L 2001/34469* (2013.01)

(56) References Cited

FOREIGN PATENT DOCUMENTS

| | | | |
|---|---|---|---|
| DE | 102008055175 A1 | 7/2009 | |
| DE | 102013104573 A1 | 11/2014 | |
| DE | 102013104575 A1 | 11/2014 | |
| EP | 2466081 A1 | 6/2012 | |
| EP | 2966272 A2 | 1/2016 | |
| EP | 2977569 A1 | 1/2016 | |

* cited by examiner

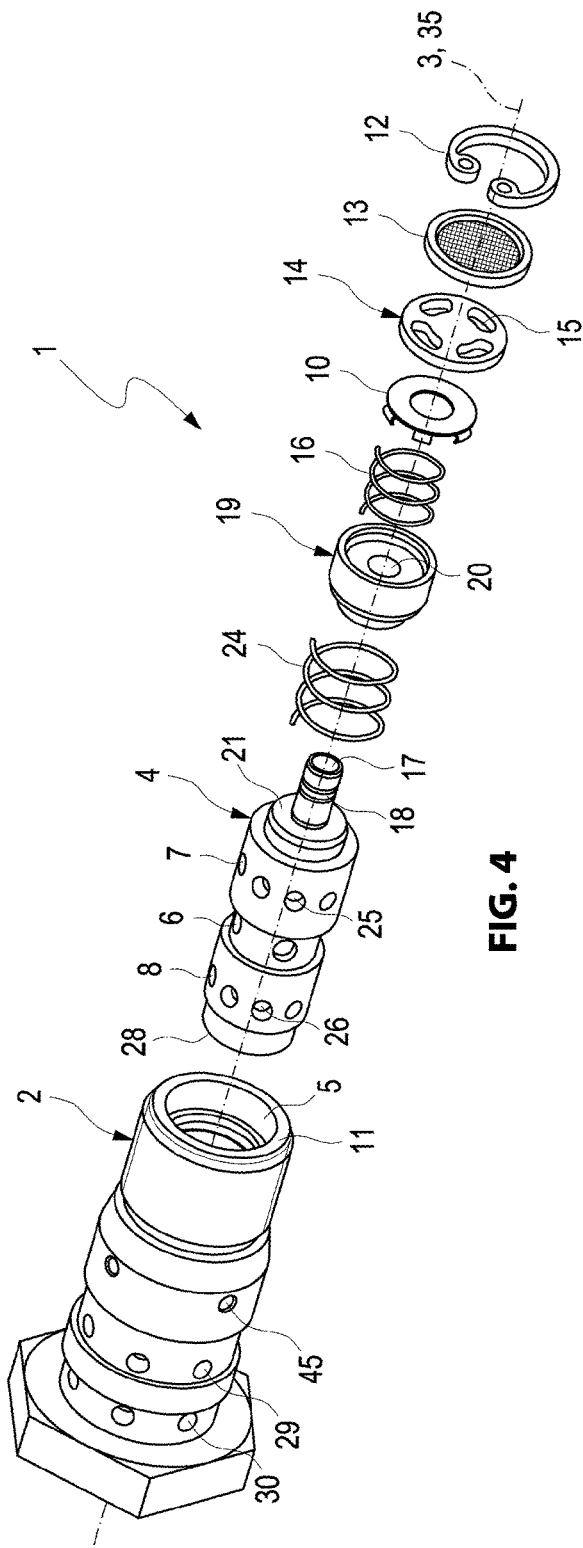
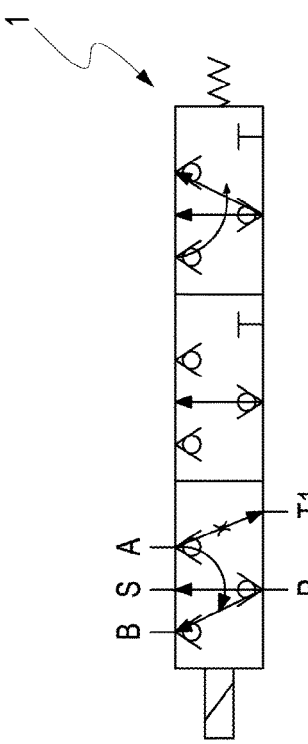
FIG. 4
FIG. 5

PISTON FOR A HYDRAULIC VALVE FOR A CAM PHASER AND HYDRAULIC VALVE FOR THE CAM PHASER

RELATED APPLICATIONS

This application claims priority from and incorporates by reference U.S. Provisional Patent Application 62/307,745 filed on Mar. 14, 2016.

FIELD OF THE INVENTION

The invention relates to a piston for a hydraulic valve of a cam phaser according to the preamble of patent claim 1 and a hydraulic valve for a cam phaser according patent claim 10.

BACKGROUND OF THE INVENTION

Hydraulic valves for cam phasers for internal combustion engines are well known in the art. The hydraulic valve includes a piston that is axially movable in a housing of the hydraulic valve and that controls a hydraulic loading of the cam phaser. Hydraulic valves come in many different configurations. The housing is configured hollow cylindrical. The piston is also configured hollow cylindrical. Controlling the cam phaser is done hydraulically by positioning the flowable piston and opening and closing connections configured in the housing accordingly.

The publication documents DE 10 2013 104 573 A1 and DE 10 2013 104 575 A1 disclose a hydraulic valve which includes a supply connection at a housing end so that direct flowing of the piston received in the housing and thus straight loading of the piston with a hydraulic fluid that is fed through the supply connection can be provided. The piston has a complex outer geometry so that a flow back from the operating connections into the piston is avoided.

The publication documents US 2014/0311333 A1 and US 2014/0311594 A1 disclose a hydraulic valve which includes check valves that are configured at a circumference of the piston. This either requires a complex housing configuration for receiving and securing the check valves or the housing is configured in plural components and requires a high level of assembly complexity. The piston is configured from multiple components and the individual components are joined concentrically which requires complex assembly since axial misalignments have to be avoided when the components are pressed together.

Another hydraulic valve which includes so called center position locking can be derived from the publication document EP 2 966 272 A2. The piston has a complex external geometry since additional locking connections are arranged in the housing of the hydraulic valve.

BRIEF SUMMARY OF THE INVENTION

Thus, it is an object of the instant invention to provide a piston for a hydraulic valve for a cam phaser which operates reliably and has low production cost. It is another object of the invention to provide a hydraulic valve which can be produced in a cost effective manner.

The object is achieved according to the invention by a piston for a hydraulic valve of a rotation phaser, wherein the piston is configured hollow cylindrical, wherein the piston is axially movable in a central opening extending along a first longitudinal axis of a housing of the hydraulic valve, wherein a first operating connection and a second operating connection of the housing are opened and closed according to a position of the piston, wherein the piston includes a first check valve and a second check valve which prevent an unintentional outflow of a hydraulic fluid flowing through the piston from an inner cavity of the piston in a first flow through opening and a second flow though opening of the piston associated respectively with the first operating connection and the second operating connection, wherein the piston is configured with the first check valve and the second check valve in an inner cavity of the piston so that that the first check valve and the second check valve opens towards the inner cavity of the piston, and wherein the first check valve and the second check valve is fixated by a spacer element that is arranged between the first check valve and the second check valve.

Another object is achieved by a hydraulic valve for a cam phaser, the hydraulic valve including a housing; a piston that is axially movable in a central opening extending along a first longitudinal axis of the housing, wherein a first operating connection and a second operating connection of the housing are opened and closed according to a position of the piston, wherein the piston includes a first check valve and a second check valve which prevent an unintentional outflow of a hydraulic fluid flowing through the piston from an inner cavity of the piston in a first flow through opening and a second flow though opening of the piston associated respectively with the first operating connection and the second operating connection, and wherein the piston is configured according to claim 1.

Advantageous embodiments with useful and non-trivial variation of the invention are defined by the dependent claims.

The piston according to the invention for a hydraulic valve of a cam phaser is configured hollow cylindrical. The piston is axially movable in a central opening extending along a first longitudinal axis of a housing of the hydraulic valve, wherein in particular operating connections of the housing are opened can closed by the piston according to a positioning of the piston. In order to avoid an undesirable outflow of a hydraulic fluid flowing through the piston from an interior of the piston flow through openings of the piston associated with the operating connections include check valves. According to the invention the piston is configured to receive check valves in its interior that open towards its interior, wherein the check valves are fixated by a spacer element arranged between the two check valves.

The arrangement of the check valves in an interior of the piston provides a piston with an outer geometry that can be fabricated in a cost effective manner, wherein the check valves prevent an unintentional overflow of the hydraulic fluid.

The check valves are provided to secure the connection openings against unintentional mutual flow through. This can occur in particular under pulsed hydraulic pressures. This means either that the housing has to have two connection openings per operating connection or the piston is configured with a complex groove geometry so that filling and emptying pressure cavities of the cam phaser can be performed simultaneously.

The spacer element is used for fixating the check valves and for securing the check valves relative to each other in an interior of the piston. Thus, the spacer element helps to avoid a complex inner geometry of the piston which would be necessary to fixate the check valves. Receiving the check valves in an interior and fixating the check valves with a spacer element facilitates fabricating the piston integrally in one piece. Thus, a cost effective fabrication of the piston can be implemented since complex assembly of the piston does not have to be performed any more.

In one embodiment the spacer element has a cross or star shaped cross section. Thus, flow channels can be configured in the spacer element so that a controlled flow deflection of the hydraulic fluid is provided in the interior space starting from the flow through openings associated with the operating connections. For example when the piston is positioned for filing a pressure cavity associated with one operating connection hydraulic fluid that enters through the supply connection flows from the inner cavity into the flow through opening associated with the operating connection. Through the other operating connection hydraulic fluid flows at least partially from a pressure chamber associated with the operating connection through the check valve into the interior cavity. The flow channels configured in the spacer element conduct the hydraulic fluid directly into the flow through opening of the operating connection through which the filling is performed. The hydraulic fluid cannot flow into the entire inner cavity first, but it is conducted from the flow through opening which is associated with the operating connection of the pressure cavity to be emptied directly into the flow through opening which is associated with the operating connection of the pressure cavity to be filed. This facilitates quicker filling and thus reduces a reaction time of the cam phaser.

In order to support an insertion of the spacer element into the piston during assembly the spacer element includes a bevel at least at a side surface or the side surface edge is configured rounded.

It has proven to be particularly advantageous for assembling the hydraulic valve to configure the bevel with an angle of 15°. Greater angles can lead to wedging and binding of the spacer element during assembly. A smaller angle, in particular an angle of less than 10° does not yield any further improvement of the insertion of the spacer element.

In another embodiment an outer surface of the spacer element is configured adapted to an interior diameter of the piston. Thus, advantageously a substantially complete separation of the flow channels configured by the spacer element can be provided. On the other hand side the spacer element can be safely retained in the piston due to surface friction during assembly.

The second aspect of the invention relates to a hydraulic valve for a cam phaser. The hydraulic valve includes a housing and a piston that is axially movable in a central opening extending along a first longitudinal axis of the housing. Corresponding to a positioning of the piston in particular operating connections of the housing are opened and closed. In order to prevent an undesirable outflow of hydraulic fluid flowing through the piston from an interior of the piston in flow through openings of the piston associated with the operating connections the piston includes at least one check valve. According to the invention the piston is configured according to one of the claims 1-9.

The hydraulic valve according to the invention is flexible when modifying flow through openings relative to a piston travel so that hydraulic valves which have at least two connection openings per operating connection can be reduced to one connection opening per operating connection. This is caused by the fact that the hydraulic valve according to the invention has check valves that are movable together with the piston and which move relative to the connection openings whereas the check valves are fixated in the prior art hydraulic valves.

Furthermore the piston can be used in its basic geometry for different variants of the hydraulic valve due to an exterior geometry of the piston being simple to produce so that complex development work can be avoided. Thus, the hydraulic valve can be produced in a cost effective manner.

In one embodiment of the hydraulic valve according to the invention the supply connection is arranged at a first end of the tubular housing so that the piston can be impacted by the flow directly and without loss inducing flow deflection. This improves reaction time and reaction speed of the cam phaser.

In another embodiment the hydraulic valve includes additional connection openings for controlling a cam phaser with center position locking. It is an advantage of the hydraulic valve according to the invention over a prior art hydraulic valve that is provided for a cam phaser with center position locking that a required installation space is substantially reduced. This helps to implement a compact cam phaser which has a reduced installation space requirement compared to a prior art cam phaser with center positon locking.

BRIEF DESCRIPTION OF THE DRAWINGS

Other advantages, features and details of the invention can be derived from the subsequent description of advantageous embodiments and from the drawing figures. The features and feature combinations recited in the preceding description and the features and feature combinations recited and shown individually in the figure description and in the figures are not only usable in the respectively recited combination but also in other combinations or by themselves without departing from the spirit and scope of the invention. Identical or functionally equivalent elements are designated with identical reference numerals. For reasons of clarity it is possible that elements are not designated with reference numerals in all figures without losing their association, wherein:

FIG. 4 illustrates an exploded view of the hydraulic valve according to FIG. 1;

FIG. 5 illustrates a symbol view of the hydraulic valve according to FIG. 1 in various positions;

DETAILED DESCRIPTION OF THE INVENTION

Figure 1:
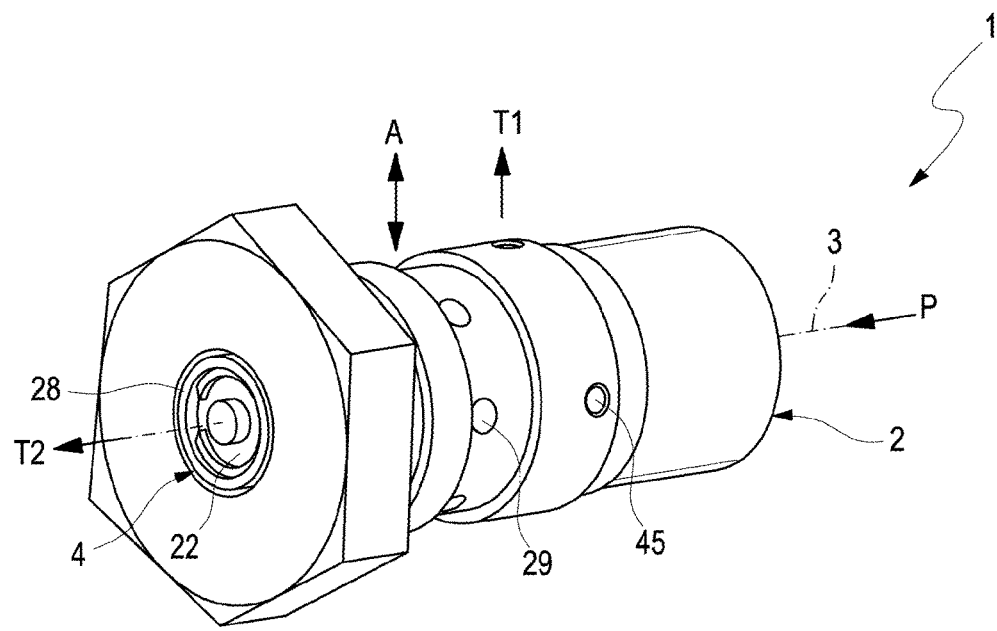
FIG. 1 illustrates a hydraulic valve according to the invention for a cam phaser in a first embodiment.
Figure 2:
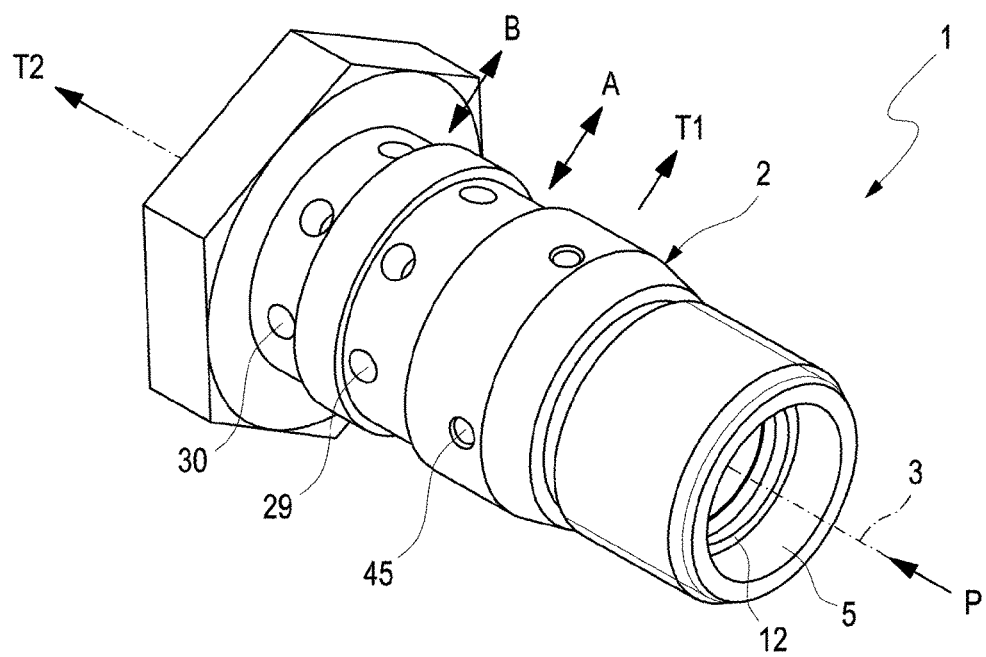
FIG. 2 illustrates another perspective view of the hydraulic valve according to FIG. 1.

A hydraulic valve 1 according to the invention for a cam phaser for a cam that is not illustrated in more detail is configured in a first embodiment according to FIG. 1. The hydraulic valve 1 is configured as a central valve to be received in a rotor of a cam phaser that is not illustrated in more detail. Put differently, the hydraulic valve 1 is received in a central opening of the cam phaser, so that it is at least partially enveloped by the receiving cam phaser.

The hydraulic valve 1 includes a housing 2 which is configured flow able. In order to hydraulically supply the cam phaser plural connections A, B, P, T1, T2 are provided at the housing 2. In the housing 2 a piston 4 is received in a central opening 5 of the housing 2 so that the piston is axially movable along a first longitudinal axis 3 of the hydraulic valve 1. The housing 2 is configured substantially tubular.

The cam phaser facilitates adjusting opening and closing times of gas exchange valves of the internal combustion engine during operation. Thus, the cam phaser is used to continuously adjust a relative angular position of a cam shaft of the internal combustion engine that is not illustrated in more detail relative to a crank shaft of the internal combustion engine that is not illustrated in more detail wherein the cam shaft is rotated relative to the crank shaft. Rotating the cam shaft adjusts the opening and closing times of the gas exchange valves so that the internal combustion engine can deliver optimum power at a respective speed.

A stator of the cam phaser that is not illustrated in more detail is connected torque proof with a drive wheel of the cam shaft that is not illustrated in more detail. At insides of a stator base element radially inward extending bars are configured in regular intervals so that an intermediary space is formed between two respective adjacent bars. A lobe that is not illustrated in more detail of a rotor hub of the rotor that is not illustrated in more detail is arranged so that it protrudes into the intermediary space. Corresponding to the number of the intermediary spaces the rotor hub includes a number of lobes. Thus, the lobes divide each intermediary space into two pressure cavities. A pressure medium, typically a hydraulic fluid is introduced into these partial spaces in a controlled manner by the hydraulic valve 1.

A pressure cavity is associated with each operating connection A, B. Thus, a first pressure cavity is associated with the first operating connection A and a second pressure cavity is associated with the second operating connection B. In order to adjust an angular position between the cam shaft and the crank shaft the pressure medium in the first pressure cavity and in the second pressure cavity is pressurized while the second pressure cavity or the first pressure cavity is unloaded. The unloading is performed through the first tank connection T1 or the second tank connection T2 wherein the hydraulic fluid can drain through the tank connection T1, T2.

Figure 3:
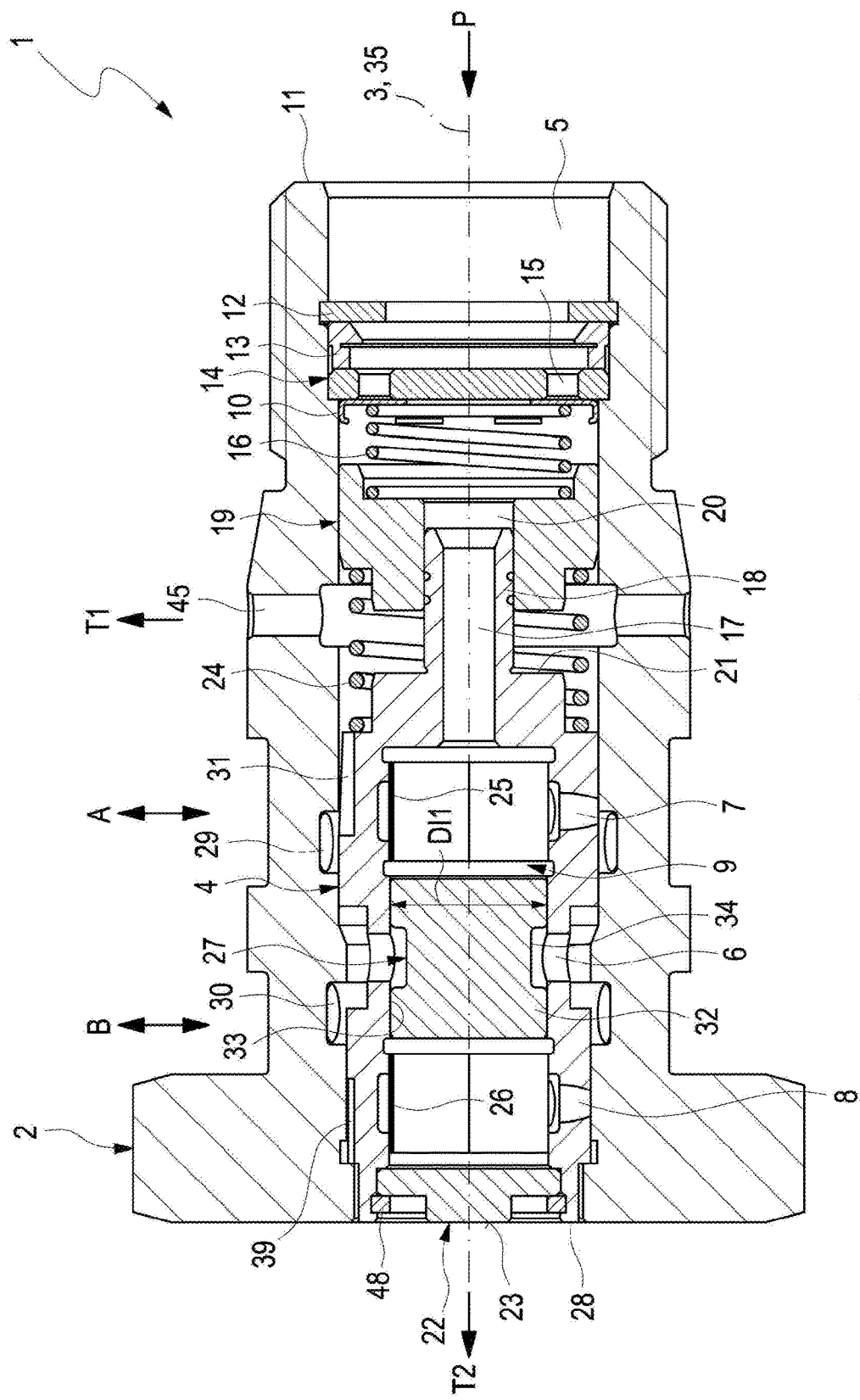
FIG. 3 illustrates a longitudinal sectional view of the hydraulic valve according to FIG. 1.

The hydraulic valve 1 according to the invention is depicted in FIG. 3 in a longitudinal sectional view. The piston 4 is configured hollow cylindrical and includes a first flow through opening 6, a second flow through opening 7, and a third flow through opening 8. Each flow through opening 6, 7, 8 is configured so that it completely penetrates the piston 4 so that starting from an inner space 9 of the piston 4 the hydraulic fluid can flow through the flow through openings 6, 7, 8 into the operating connections and tank connections A, B, T1 and T2. A back flow of the fluid into the supply connection P is prevented by a first check valve 10 which is arranged in the housing 2 in a portion of an end 11 of the housing 2 downstream of the fluid filter 13 that is secured into position by a safety element 12. Between the check valve 10 which is configured as an annular check valve and the fluid filter 13 a flow disc 14 is received in the housing 2, wherein disc openings 15 of the flow disc are closable by the first check valve 10.

The first check valve 10 is pressure loaded by a first preload element 16 in a direction towards the flow disc 14. Put differently the first check valve is pressed against the flow disc 14 by the first preload element 16 for closing the disc openings 15. As soon as the hydraulic fluid flowing through the supply connection P has a pressure which is greater than a preload force of the first preload element 16 the first check valve 10 lifts off from the flow disc 14 and the hydraulic fluid enters through the flow openings 14 into an inlet channel 17 of the piston 4 which is flow connected with the inner cavity 9.

In order to lock and support the piston 4 it includes a pinion shaped support element 18 at its first piston end 21 wherein the pinion shaped support element at least partially includes the inlet channel 17. The support element 18 engages a locking cover 19 and is received therein wherein the locking cover is used for locking, supporting and calibrating the hydraulic valve 1. Furthermore the locking cover 19 is used for supporting the first preload element 16 at a side that is oriented away from the first check valve 10. The support element 18 is engaged in a central cover opening 20 of the locking cover 19.

The piston 4 is operatively connected with an actuator that is not illustrated in more detail at a second piston end 28 that is oriented away from the first piston end 21. A piston cover 22 is positioned at a second piston end 28 wherein the piston cover 22 closes the inner space 9 against an exit of the fluid. Fluid flowing into the second tank connection T2 which flows out of the second operating connection B is run through a gap configured between the housing 2 and the piston 4 towards the second tank drain T2.

Furthermore an actuation plunger that is not illustrated in more detail can engage the piston cover 2 at a piston cover surface 23 that is oriented away from the interior space 9 so that the piston 4 is positioned in the central opening 5 using the actuator. In order to safely position the piston 4 a second preload element is provided which is arranged in the central opening 5 between the piston 4 and the locking cover 19.

The hydraulic valve 1 according to the invention includes a second check valve 25 for securing the second flow through opening 7 and a third check valve 26 for securing the third flow through opening 8 against an outflow of hydraulic fluid from the two flow through openings 7, 8 into the operating connections A, B which are flow connected by a first connection opening 29 configured in the housing 2 or a second connection opening 30 configured in the housing 2.

In order to run fluid through the two check valves 25, 26 and to secure them in place a spacer element 27 is arranged between them.

FIG. 4 illustrates the hydraulic valve 1 according to the invention in an exploded view.

Figure 6:
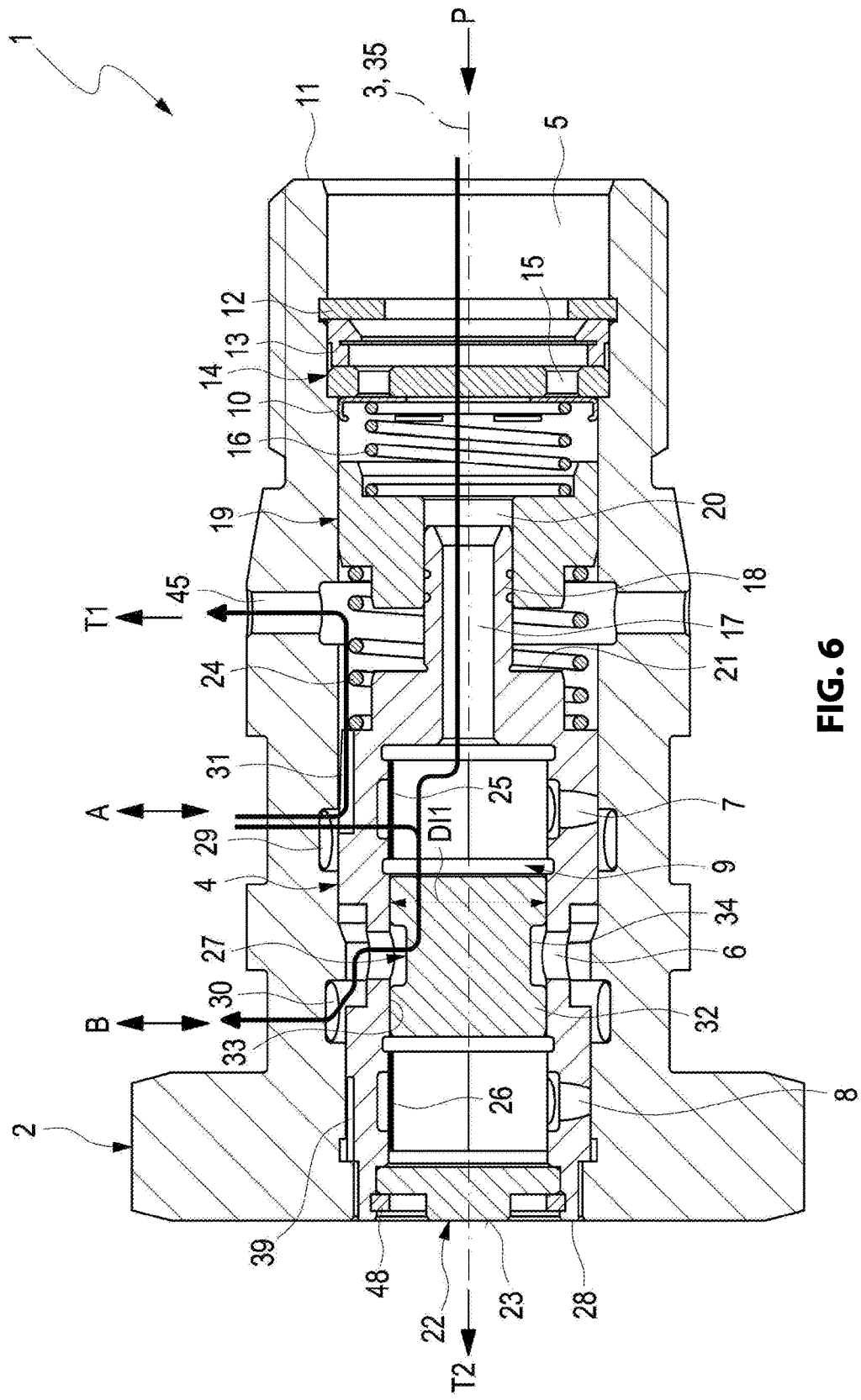
FIG. 6 illustrates a longitudinal sectional view of the hydraulic valve according to FIG. 1 in a first position.

FIG. 5 illustrates the hydraulic valve 1 according to the invention in a symbol view in various positions. The left section of the symbol view illustrated in FIG. 5 illustrates a flow through of the hydraulic valve 1 according to a first position of the piston 4 illustrated in FIG. 6. In this first position the second operating connection B is loaded with hydraulic fluid. This means put differently that the hydraulic fluid flows from the first supply connection P through the inner space 9 and the first flow through opening 6 which releases the second connection opening 30 connected with the second operating connection B. Furthermore hydraulic fluid can flow from the first operating connection A at least partially through the first connection opening 29 and by opening the first check valve 25 the hydraulic fluid can flow into the inner space 9 wherein the hydraulic fluid is run through the spacer element 27 into the first flow through opening 6. From there the hydraulic fluid flows through the second connection opening 30 into the second operating connection B. The additional portion of the fluid flowing out of the first operating connection A flows through a first drain channel 31 which is provided as a groove in a portion of the second flow through opening 7 into a third connection opening 45 configured in the housing 2 which third connection opening is associated with the first tank connection T1. The first drain channel 31 is visible in particular in FIG. 11.

The spacer element 27 which is illustrated in a particular detail in FIGS. 9A-9D on the one hand side has a function of a flow conducting element and on the other hand side it has a function of a spacer element. The spacer element has a symmetrical cross shaped cross section which can be derived in particular from FIG. 9C which illustrates the spacer element along a sectional line IXc)-IXc) of FIG. 9B.

An overflow of the fluid from the inner cavity 9 into a respective connection opening 29, 30 or of a corresponding connection A, B for filling a pressure chamber associated with the respective connection A, B is exclusively provided through the first flow through opening 6. Since the flow through opening 6 has 4 partial openings in the instant embodiment, the spacer element 27 includes four divider bars 32 arranged at a right angle relative to each other. The divider bars 32 are configured to form four flow channels in the cylindrical inner space 9 in order to provide a fluid portion that flows through the first flow through opening 6 to each partial opening. Thus, a reaction time for filling a respective pressure cavity can be substantially reduced.

The divider bars 32 are configured so that they contact an inner wall 33 of the piston 4 which inner wall defines the inner cavity 9. For a partial overflow of the fluid portion into the respective partial opening of the flow through opening 6 the divider bar 32 includes a recess 34.

In order to prevent a flow separation the recess 34 includes a first radius R1 at inner surface edges 36 that are oriented towards a second longitudinal axis 35 of the spacer element 27 and a second radius R2 at outer surface edges 37 oriented away from the second longitudinal axis 35. Advantageously the two radii are sized identically to simplify fabrication. However, the radii can be sized differently according to the application of the hydraulic valve 1.

In order to facilitate insertion of the spacer element 27 into the inner space 9 during assembly of hydraulic valve 1 the divider bars 32 respectively have a bevel with an angle α advantageously with a size of 15° at their side surface edges 38.

The spacer element 27 includes cambered outer surfaces 43 that are oriented towards the inner wall 33 and configured with an outer diameter D1 which is configured adapted to an inner diameter DI1 of the piston 4. In order to provide advantageous flow properties of the fluid the inner surfaces 44 of the recesses 34 have a diameter D2 and are thus configured cambered corresponding to the diameter D2.

Overall the spacer element is configured flow optimized through the configuration of the radii R1, R2 and of the cambered surfaces 43, 44 since a flow separation that is typical at sharp edges is at least reduced.

Figure 7:
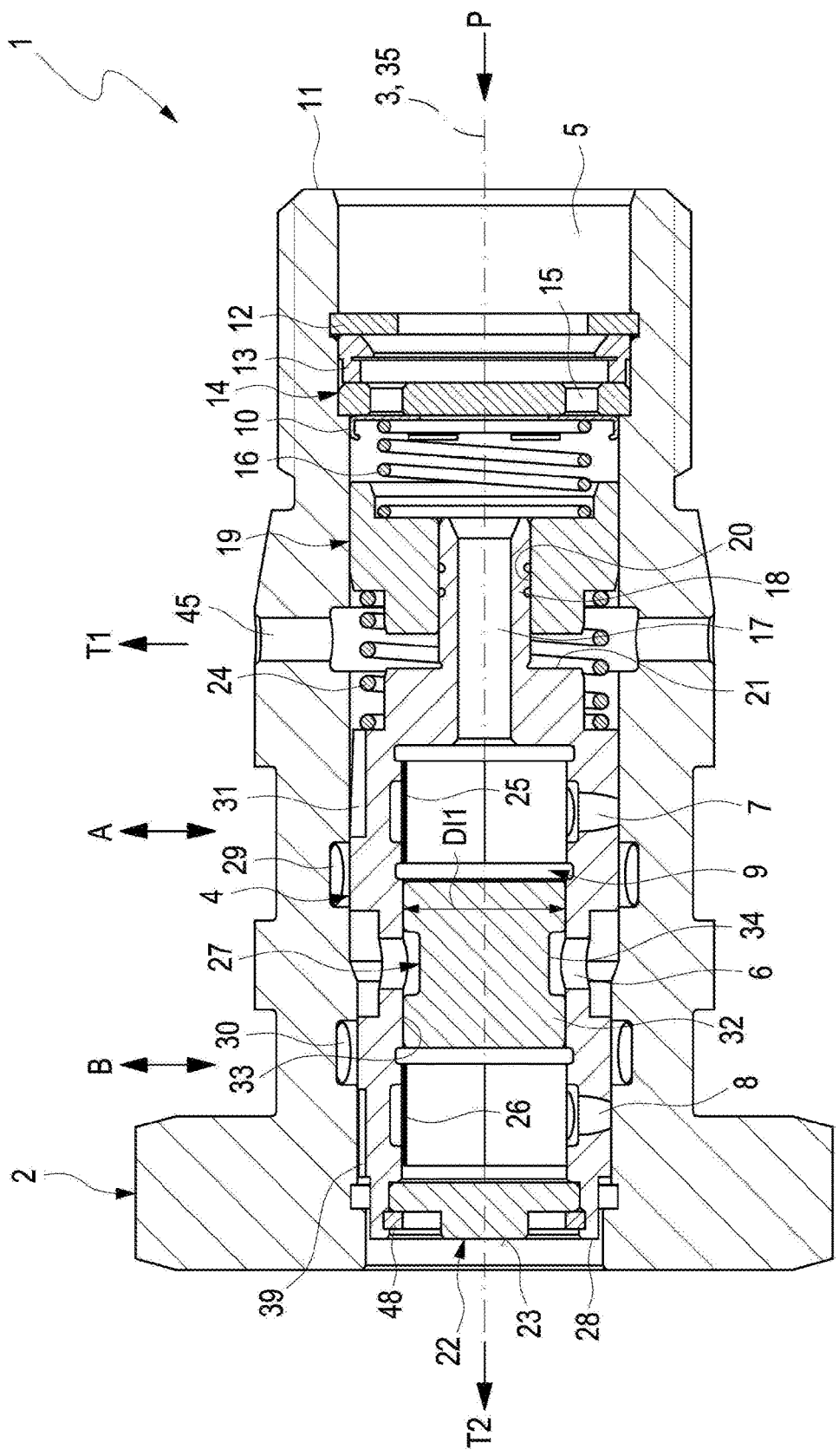
FIG. 7 illustrates a longitudinal sectional view of the hydraulic valve according to FIG. 1 in a second position.

In a center section of hydraulic valve 1 represented by a symbol the flow through of the hydraulic valve 1 is symbolically depicted in a second position of the piston 4 which corresponds to the piston position illustrated in FIG. 7. In this second position there is no flow through of the operating connections A, B.

Figure 8:
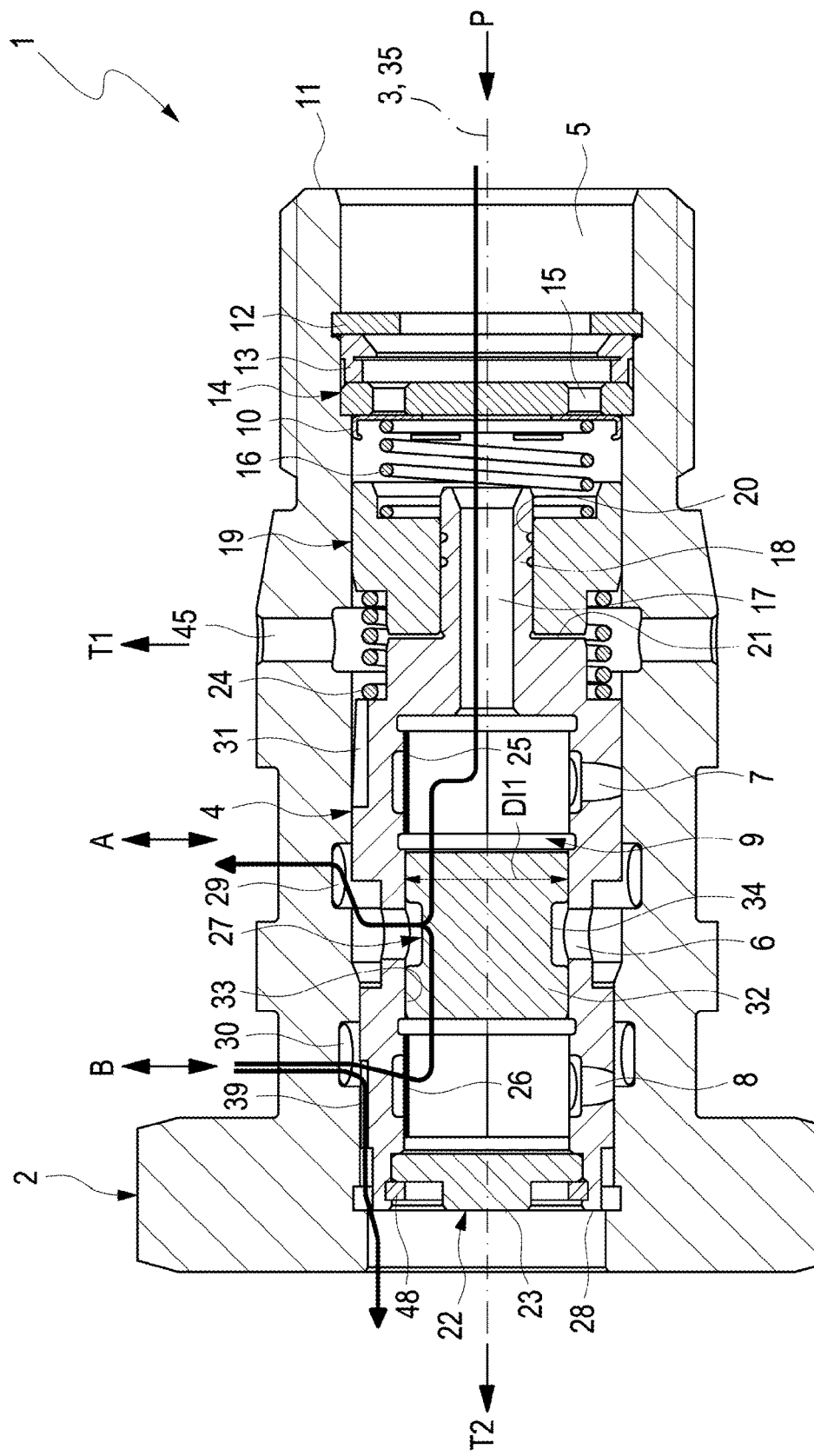
FIG. 8 illustrates a longitudinal sectional view of the hydraulic valve according to FIG. 1 in a third position.
Figure 9A:
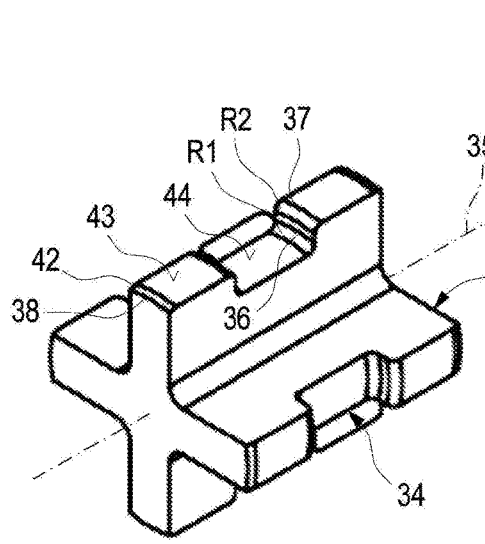
FIG. 9A illustrates perspective view of a spacer element of the hydraulic valve according to the invention according to FIG. 1.
Figure 9C:
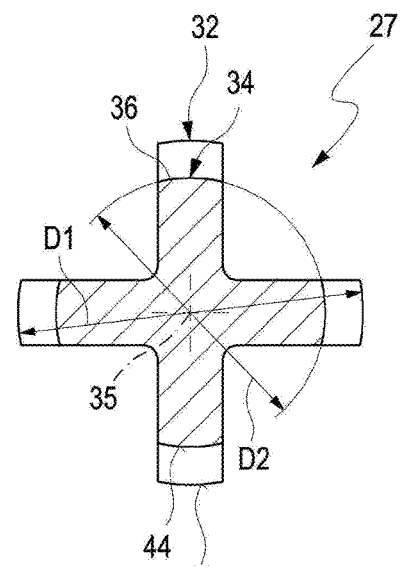
FIG. 9C illustrates a sectional view along the sectional line IXc)-IXc) of the spacer element according to FIG. 9A.
Figure 9B:
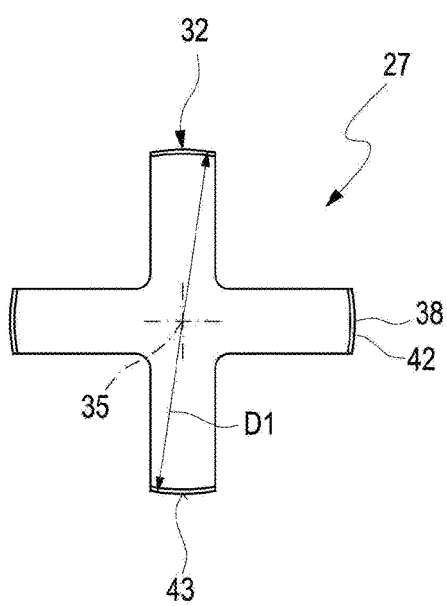
FIG. 9B illustrates a top view of the spacer element according to FIG. 9A.
Figure 9D:
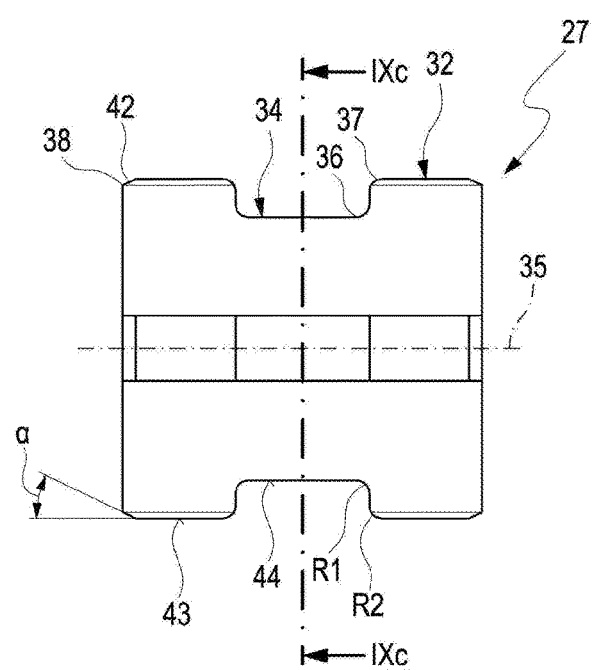
FIG. 9D) illustrates a side view of the spacer element according to FIG. 9A.

A third position of the piston 4 is illustrated in FIG. 8 and corresponds in the symbolic representation to the flow through illustrated in the right section of FIG. 5. In this position the first operating connection A is loaded with hydraulic fluid. This means put differently the hydraulic fluid flows from the supply connection P through the inner space 9 and the first flow through opening 6 which releases the first connection opening 29 that is connectable with the first operating connection A. Furthermore the hydraulic fluid can flow from the second operating connection B at least partially through the second connection opening 30 and by opening the second check valve 26 into the inner space 9, wherein it is run through the spacer element 27 into the first flow through opening 6. From there the hydraulic fluid flows through the first connection opening 29 into the first operating connection A.

Figure 10:
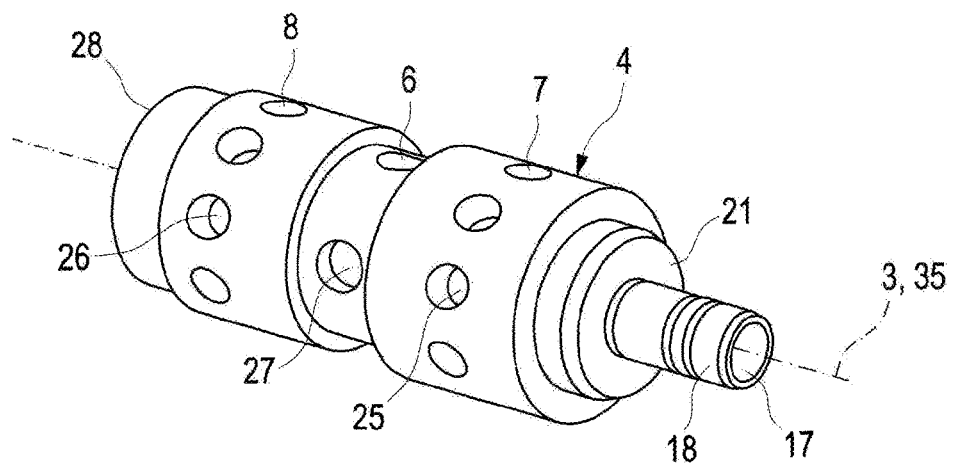
FIG. 10 illustrates a perspective view of a piston of the hydraulic valve according to FIG. 1.
Figure 11:
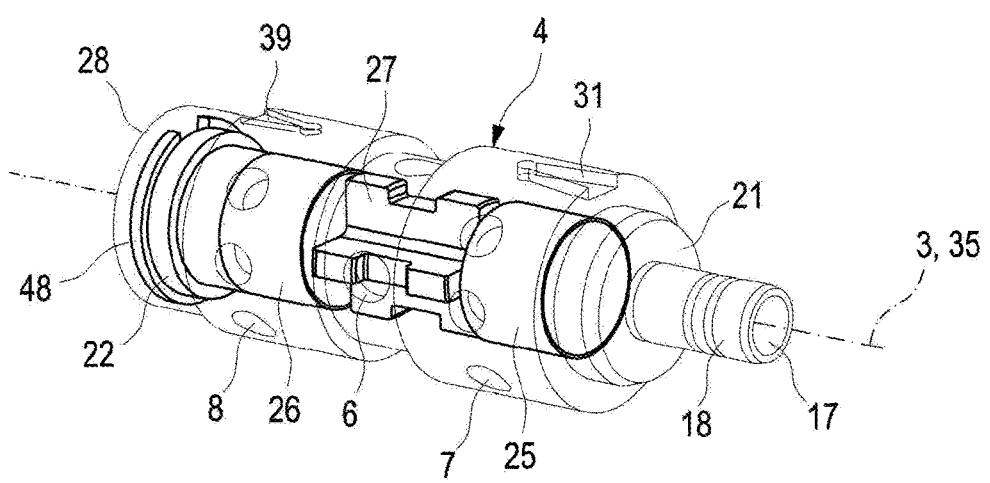
FIG. 11 illustrates the piston according to FIG. 10 in a transparent view.

The additional portion of the fluid flowing from the second operating connection B flows through a second drain channel 39 which is provided as a groove in a portion of the third flow through opening 8 and into the second tank connection T2. The second drain channel 39 can be derived in particular from FIG. 11. The piston 4 is illustrated in FIGS. 10 and 11 for further clarification.

The hydraulic valve 1 according to the invention can also be configured as a hydraulic valve 1 with so called center position locking as illustrated in a second embodiment according to FIGS. 12-16. Center position locking is a locking of the rotor with the stator which can be provided without electrical control. For this purpose the hydraulic valve 1 includes additional flowable connections in addition to the operating connections A, B known from the first embodiment. These additional connections, a first locking connection S and a second locking connection L are provided for loading a locking system of the cam phaser. These locking connections S, L are typically arranged in series with the operating connections A, B along the first longitudinal axis 3 of the housing 2 in order to simplify fabrication and assembly. This yields as a consequence a larger extension of the housing 2 along its first longitudinal axis 3. Put differently this means that the hydraulic valve 1 has a greater installed length than a comparable hydraulic valve 1 without center position locking.

Figure 12:
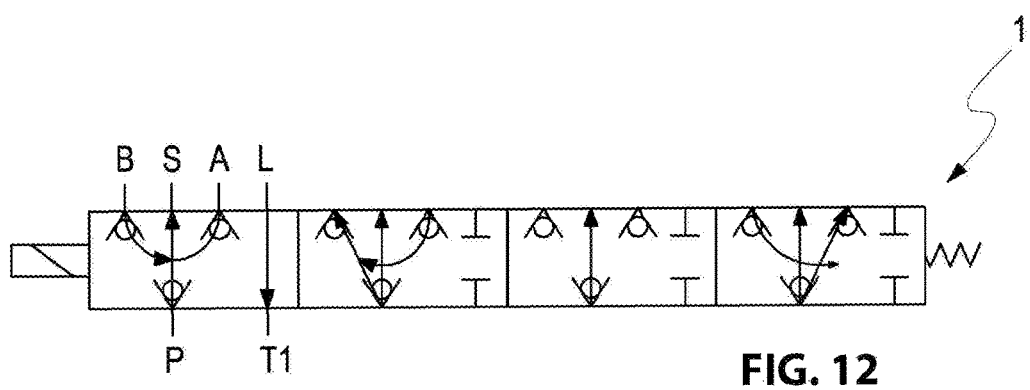
FIG. 12 illustrates a symbol view of the hydraulic valve in a second embodiment in various positions.

FIG. 12 illustrates a second embodiment of the hydraulic valve 1 according to the invention with the so called center position locking in a symbolic representation in various positions.

Due to the serial arrangement of the locking connections S, L a greater operating travel of the piston 4 or an extended stroke of the piston 4 is achieved. In order for the connections A, B, T1, T2, S, L to be flowed through in a functionally correct manner for cam phasing it is necessary to associate an additional flow through opening with the second operating connection B, wherein this additional flow through opening is designated as the flow through opening 40 and arranged in the piston 4. Depending on the positioning of the operating connections A, B the additional flow through opening could also be associated with the first operating connection A. This is a function of the configuration of the hydraulic valve 1.

In order to prevent a flow through of this fourth flow through opening 40 from the inner cavity 9 a fourth check valve 41 is associated with this flow through opening 40. It is appreciated that the check valves 25, 26, 41 received in the piston 4 are configured as band shaped check valves.

Figure 13:
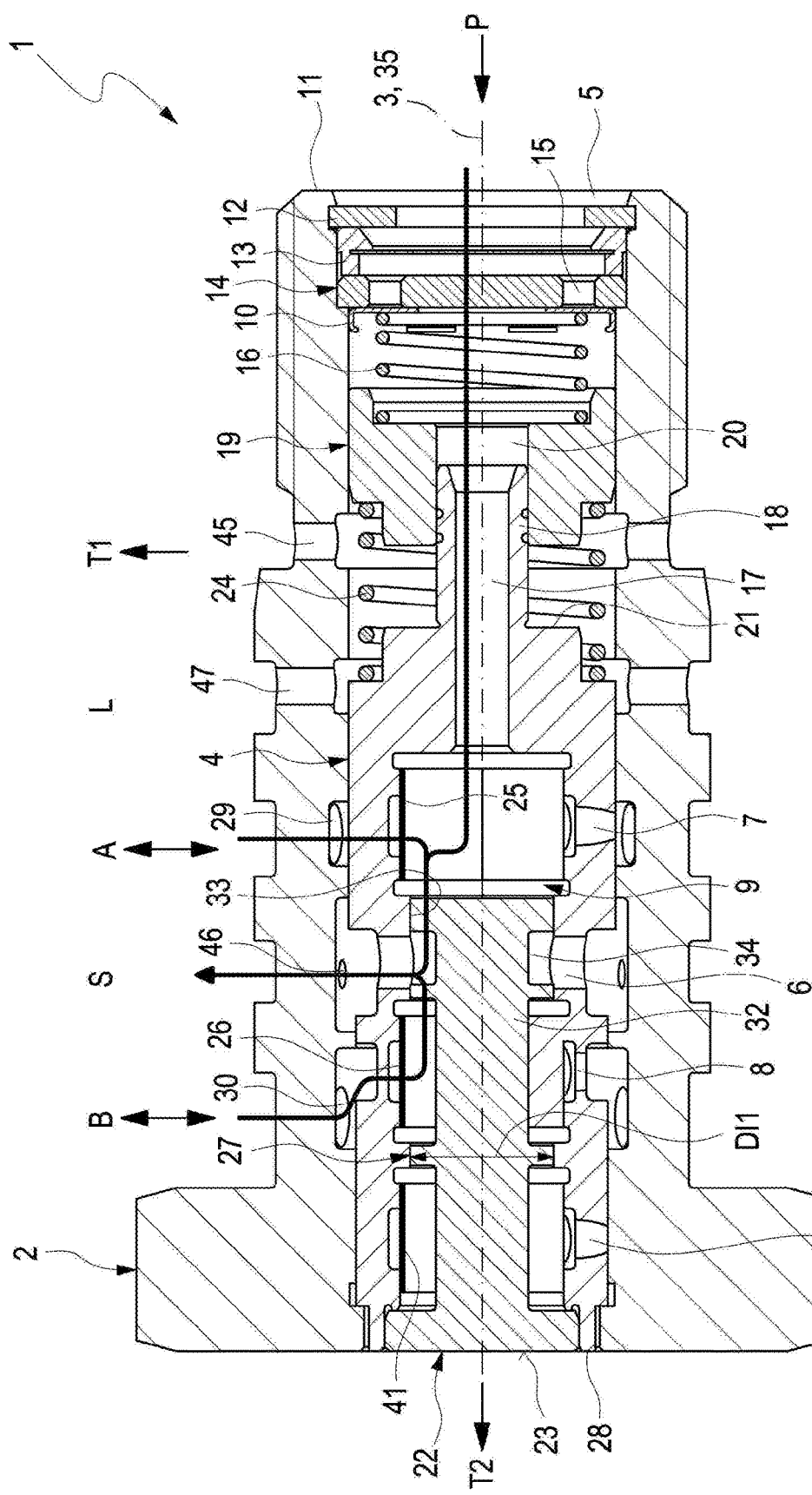
FIG. 13 illustrates a longitudinal sectional view of the hydraulic valve according to FIG. 12 in a first position.

The left section of the symbolic representation illustrated in FIG. 12 corresponds to a flow through of the hydraulic valve 1 according to a first position of the piston 4 illustrated in FIG. 13. In this first position the first locking connection S is loaded with hydraulic fluid. Put differently, the hydraulic fluid flows from the supply connection P through the inner space 9 and the first flow through opening 6 through a fourth connection opening 46 configured in the housing 2 into the first locking connection S. Simultaneously the two pressure cavities which are associated with the first operating connection A and the second operating connection B are at least partially emptied so that the hydraulic fluid flows from these pressure cavities through the operating connections A, B and their associated connection openings 29, 30 while loading of the check valves 25, 26 into the inner cavity 9 and from there through the first flow through opening 6 into the first locking connection S. Simultaneously thereto the locking system is emptied through the second locking connection L which is associated with a fifth connecting opening 47 in the housing 2 into the first tank connection T1.

The separation bar 32 of the spacer element 27 according to the second embodiment includes three recesses 34 serially arranged along the second longitudinal axis 35. This is necessary to render the third flow through opening 8 and the fourth flow through opening 40 flow able. It is an advantage of this variant of the spacer element 27 that the piston cover 22 can be configured integral with the spacer element 27 like in the instant second embodiment. This simplifies mounting the piston 4.

Figure 14:
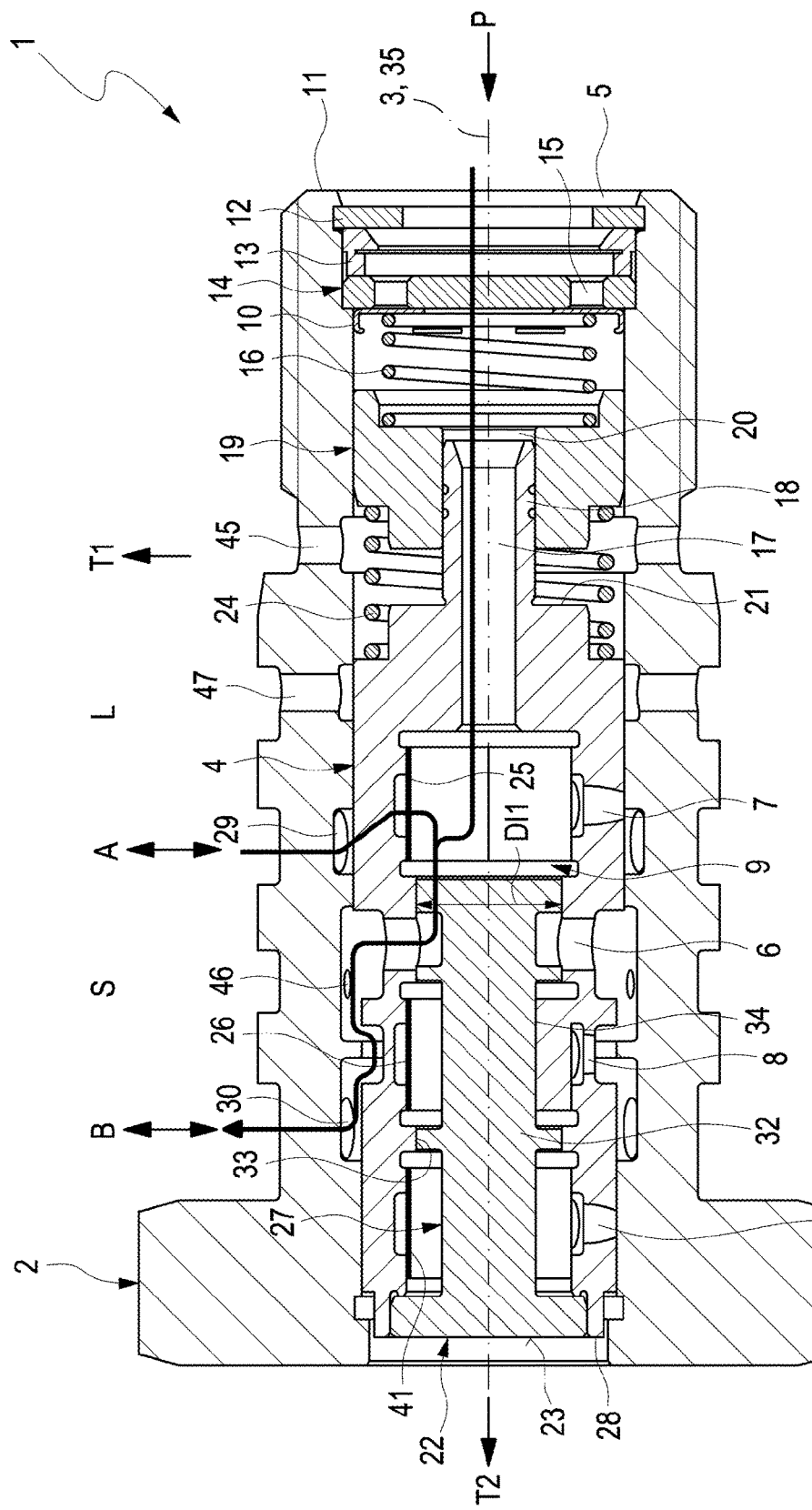
FIG. 14 illustrates a longitudinal sectional view of the hydraulic valve according to FIG. 12 in a second position.

During a pivot phase of the rotor relative to the stator in which the pressure cavity associated with the second operating connection B is filled with hydraulic fluid the piston 4 is positioned as illustrated in FIG. 14. The hydraulic fluid flows from the supply connection P through the inner space 9 and the first flow through opening 6 which is flow connected with the second operating connection B, wherein the second connection opening 30 is released. Furthermore the hydraulic fluid can flow from the first operating connection A at least partially through the first connection opening 29 and by opening of the first check valve 25 into the inner cavity 9 wherein the hydraulic fluid is routed through the spacer element 27 into the first flow through opening 6. From there it flows on onward through the second connection opening 30 into the second operating connection B. The remaining connections S, L are blocked by the piston 4.

Figure 15:
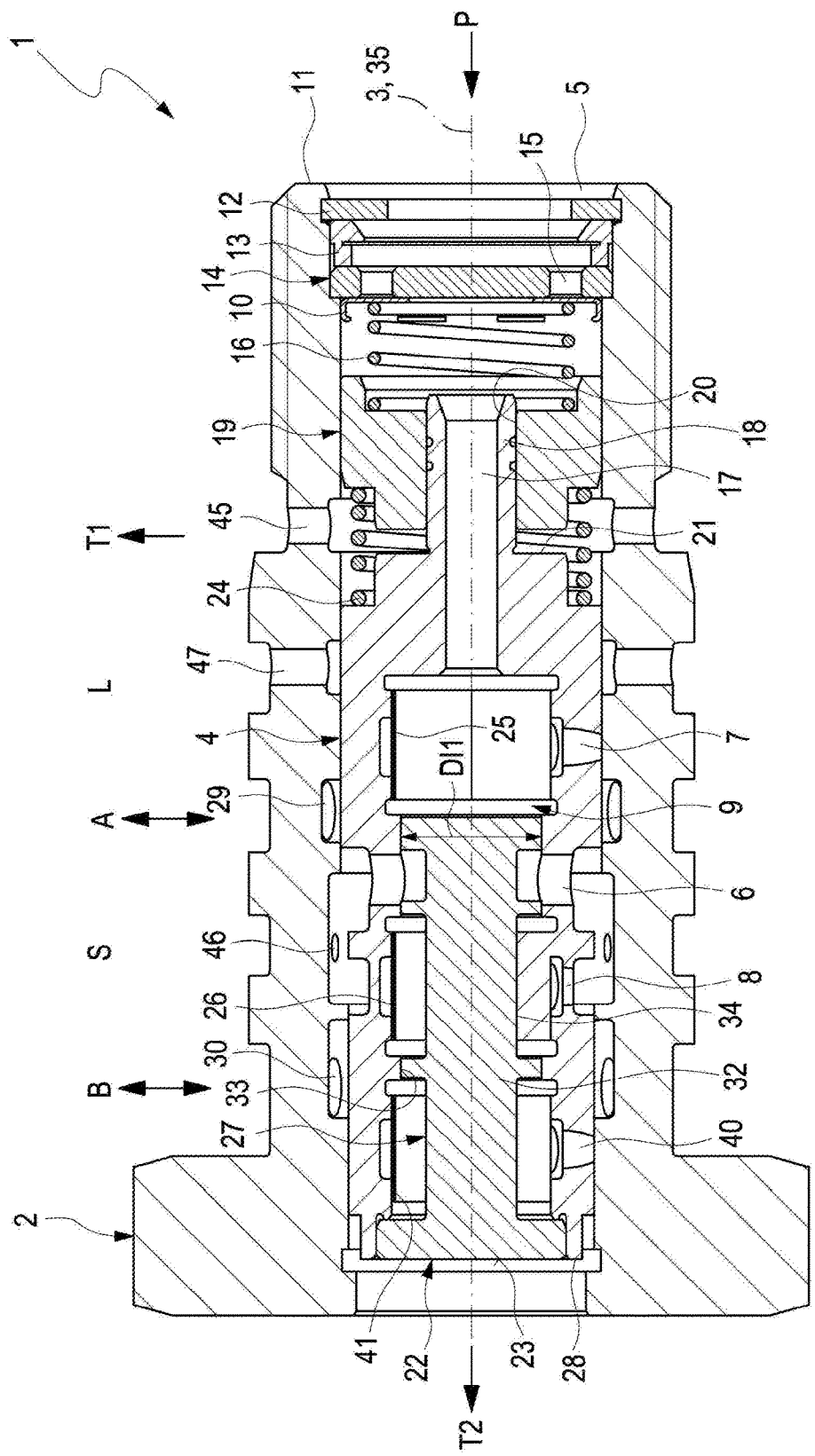
FIG. 15 illustrates a longitudinal sectional view of the hydraulic valve according to FIG. 12 in a third positon.
Figure 16:
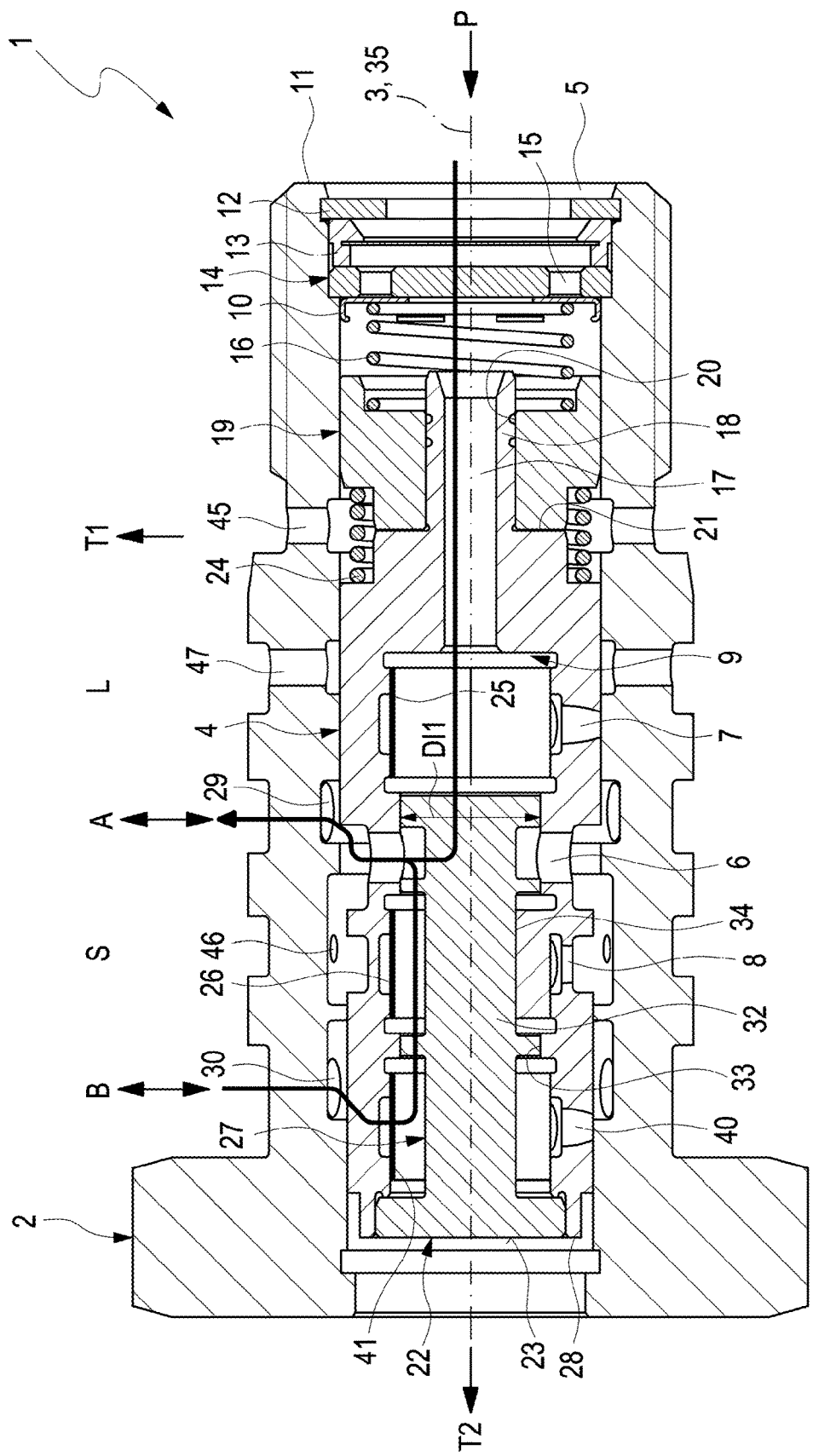
FIG. 16 illustrates a longitudinal sectional view of the hydraulic valve according to FIG. 12 in a fourth position.

The piston 4 is in a so called resting positon if the first operating connection A as well as the second operating connection B is blocked. This position further designated as the third position is illustrated in FIG. 15 or in the symbolic representation in the second section from the right.

In a fourth position the piston 4 facilitates a flow through of the first operating connection A, wherein the first connection opening 29 is released by the first flow through opening 6. In this position a filling of the pressure cavity associated with the first operating connection A is performed while emptying the pressure cavity associated with the second operating connection B. The hydraulic fluid flows from the supply connection P through the inner cavity 9 and the first flow through opening 6 which is flow connected with the first operating connection A wherein the first connection opening 29 is released. Furthermore hydraulic fluid can flow from the second operating connection B at least partially through the second connection opening 30 and by opening of the fourth check valve 41 into the inner cavity 9, wherein the spacer element 27 facilitates running the hydraulic fluid through the first check valve 26 into the first flow through opening 6. From there the hydraulic fluid flows through the first connection opening 29 into the first operating connection A. The remaining connections S, L are blocked by the piston 4.

Figure 17:
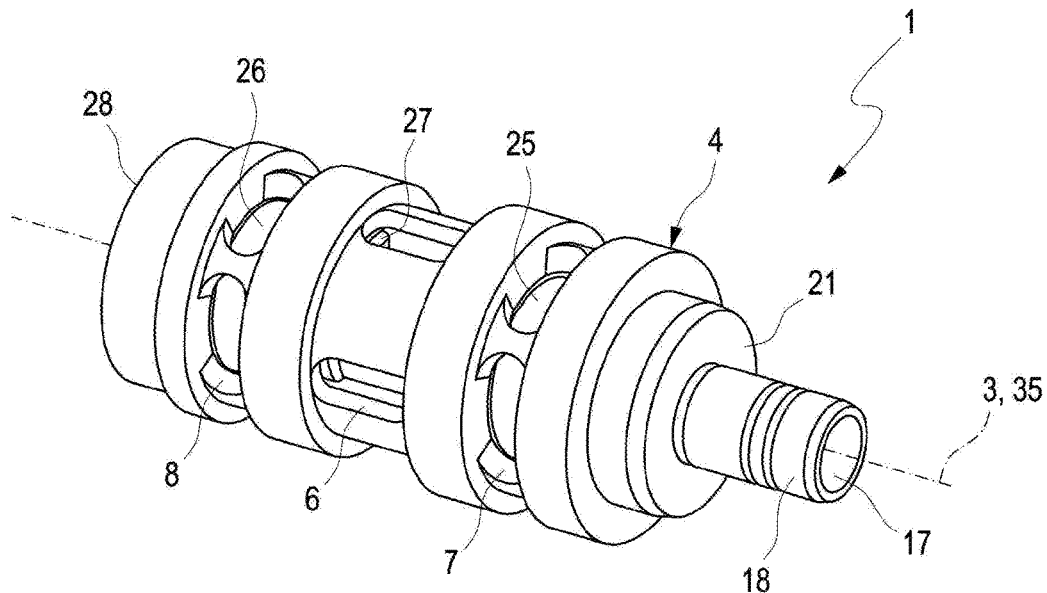
FIG. 17 illustrates a perspective view of a piston of the hydraulic valve according o FIG. 12.
Figure 18:
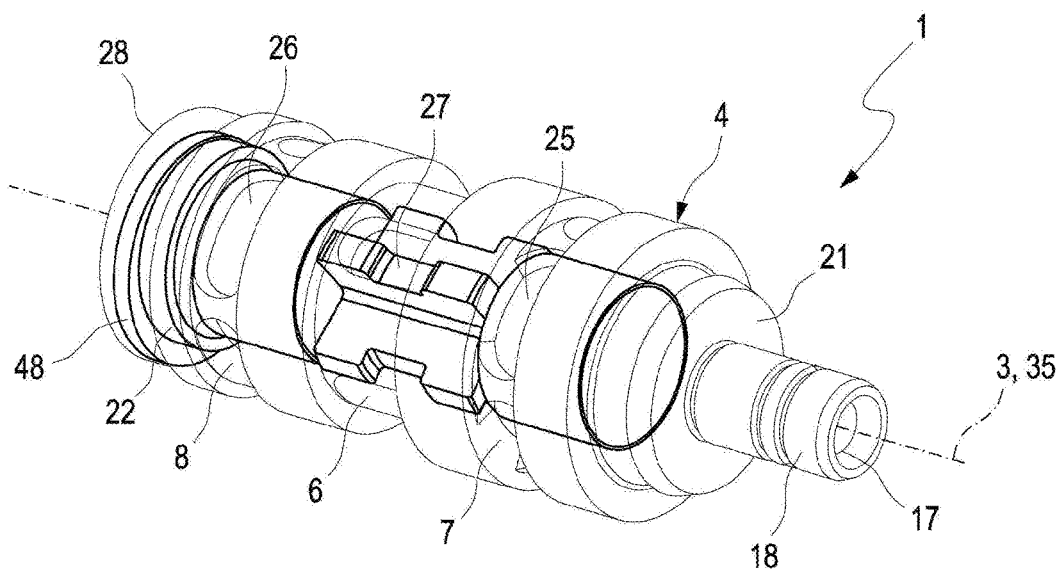
FIG. 18 illustrates a transparent view of the piston according to FIG. 17.

FIGS. 17 and 18 illustrate the hydraulic valve 1 according to the invention in a third embodiment wherein the flow through openings 6, 7, 8 are configured as slotted holes. The piston cover 22 is secured at the piston 4 by an additional safety element 48 configured as a snap ring.

What is claimed is:

1. A piston for a hydraulic valve of a rotation phaser,
   wherein the piston is configured hollow cylindrical,
   wherein the piston is axially movable in a central opening extending along a first longitudinal axis of a housing of the hydraulic valve,
   wherein a first operating connection and a second operating connection of the housing are opened and closed according to a position of the piston,
   wherein the piston includes a first check valve and a second check valve which prevent an unintentional outflow of a hydraulic fluid flowing through the piston from an inner cavity of the piston in a first flow through opening and a second flow though opening of the piston associated respectively with the first operating connection and the second operating connection,
   wherein the piston is configured with the first check valve and the second check valve in an inner cavity of the piston so that that the first check valve and the second check valve opens towards the inner cavity of the piston, and
   wherein the first check valve and the second check valve is fixated by a spacer element that is arranged between the first check valve and the second check valve.

2. The piston according to claim 1, wherein the spacer element has a cross or star shaped cross section.

3. The piston according to claim 1, wherein the spacer element includes at least one divider bar.

4. The piston according to claim 3, wherein the divider bar includes a recess.

5. The piston according to claim 4, wherein the recess includes a circumferentially cambered inner surface.

6. The piston according to claim 1,
   wherein the spacer element includes a bevel at least at one side surface edge, or
   wherein the side surface edge is configured cambered.

7. The piston according to claim 6, wherein the bevel has an angle of 15°.

8. The piston according to claim 1, wherein an outer surface of the spacer element is adapted to an inner diameter of the piston.

9. The piston according to claim 1, wherein the spacer element includes a piston cover.

10. A hydraulic valve for a cam phaser, the hydraulic valve comprising:
   a housing;
   a piston that is axially movable in a central opening extending along a first longitudinal axis of the housing;
   wherein a first operating connection and a second operating connection of the housing are opened and closed according to a position of the piston,
   wherein the piston includes a first check valve and a second check valve which prevent an unintentional outflow of a hydraulic fluid flowing through the piston from an inner cavity of the piston in a first flow through opening and a second flow though opening of the piston associated respectively with the first operating connection and the second operating connection, and
   wherein the piston is configured according to claim 1.

11. The hydraulic valve according to claim 10, wherein the supply connection is arranged at an end of the housing.

12. The hydraulic valve according to claim 10, wherein the hydraulic valve includes additional connection openings configured to control a rotation phaser with center position locking.

* * * * *